United States Patent [19]
Kamieniecki et al.

[11] Patent Number: 5,969,835
[45] Date of Patent: Oct. 19, 1999

[54] AUTOMATED INFRARED TEST SIGNAL GENERATOR

[75] Inventors: John Kamieniecki, Lafayette Hill; Tony Nasuti, Norristown, both of Pa.

[73] Assignee: General Instrument Corporation, Horsham, Pa.

[21] Appl. No.: 08/929,547

[22] Filed: Sep. 15, 1997

[51] Int. Cl.$^6$ .................................................. H04B 10/08
[52] U.S. Cl. .................... 359/110; 359/142; 348/734; 340/825.72; 455/151.2
[58] Field of Search ........................... 359/110, 142–143, 359/144, 146; 348/734; 340/825–72; 455/151-2

[56] References Cited

U.S. PATENT DOCUMENTS

| | | | |
|---|---|---|---|
| 4,718,112 | 1/1988 | Shinoda | 455/151 |
| 5,157,652 | 10/1992 | Walker | 359/110 |
| 5,204,768 | 4/1993 | Tsakiris et al. | 359/148 |
| 5,218,465 | 6/1993 | Lebby et al. | 359/110 |
| 5,367,394 | 11/1994 | Chuter et al. | 359/110 |
| 5,416,623 | 5/1995 | Dawson et al. | 359/110 |
| 5,418,527 | 5/1995 | Yashiro | 340/825.24 |
| 5,606,443 | 2/1997 | Sgambati | 359/143 |

*Primary Examiner*—Kinfe-Michael Negash
*Attorney, Agent, or Firm*—Barry R. Lipsitz

[57] ABSTRACT

An automated signal generator apparatus allows testing of remotely-controlled electronic devices to verify functionality and reliability, or for product set-up, initialization or configuration. The apparatus simulates a person pressing the keys on a remote control key pad, and can simulate key press sequences, key press duration, and time between key presses. Other human interfaces may also be simulated. The apparatus can be continuously driven by an external computer in a slaved mode, or can store test instructions in an internal memory to operate in a standalone mode. Test instructions, which may be written in a macro script language, are processed by a microprocessor to provide a control signal to, e.g., an infrared (IR) transmitter. The IR transmitter can control one or more electronic devices which are under test. The transmitter may use a wide angle IR beam, or a plurality of separate transmitters for testing of a plurality of electronic devices at the same time. In a human learning mode, control signals from a human interface are processed to provide time compression or repetition of a fixed control sequence.

33 Claims, 5 Drawing Sheets

AUTOMATED INFRARED TEST SIGNAL GENERATOR

BACKGROUND OF THE INVENTION

The present invention relates to an apparatus and method for generating infrared (IR) test signals for use in reliability and functionality testing of IR-controlled electronic devices. The system may also be used during production to expedite product set-up. The system is particularly suitable for use in providing test signals that emulate the commands of a human interface such as a hand-held remote control transmitter commonly used to control a television, television decoder, or other remotely operated electronic device. The system is termed a "Robo-finger" computer driven remote control emulator.

Remote control IR transmitters are commonly used to control electronic devices. Such transmitters are typically compact enough to be hand held, and provide a keypad with one or more keys, or other control buttons or switches which are pressed or otherwise actuated to achieve a desired control signal. For example, hand held IR remote control units are often used to operate consumer electronic goods such as televisions, television decoders (e.g., converters, terminals or set-top boxes), video cassette recorders (VCRs), audio equipment, Internet web surfers, personal computers, and video game consoles. Such control units have also found applications in the household to control ceiling fans, skylights, and security systems, for example. Remote transmitters may also be used by the infirm to actuate an emergency telephone dialing system. Automotive applications include door and trunk openers, and security systems. Various other uses for remote IR transmitters exist to improve convenience and safety for the user.

The physical operation of IR transmitters and receivers is well known. The transmitter uses an amplifier and diodes to provide a modulated IR signal, e.g., radiation having a wavelength in the spectrum from approximately 1 $\mu$m to 1 mm, which corresponds to a command, such as "power on" or "channel up". The transmitter is aimed by the user toward the device which is to be operated. The device has an IR receiver which demodulates the signal to recover and execute the desired command. For cosmetic reasons, the receiver may be built-in behind a panel which is transparent to the radiation. The radiation has an effective range typically of several meters.

For television applications, numerous commands may be transmitted via the IR signal, including power on or off, channel selection, closed captioning on or off, closed captioning language selection, split screen, picture in picture, picture contrast, color, and brightness control. Various audio commands include volume, equalizer, surround sound, treble, bass, and home theater settings. Additionally, recent television services provide on-screen graphical displays which allow a user to order programs (e.g., pay-per-view) or order goods from a home shopping channel, for example. Further interactive applications will allow the user to participate in contests or other interactive games or educational activities, or to access computer networks (e.g., the Internet) through the television.

Moreover, while hand-held IR transmitters commonly have keys which are pressed by the user, IR transmitters may operate with other mechanical or non-mechanical interfaces. For example, alternative mechanical interfaces include a joystick, lever, mouse, wheel, pressure activated switch, track ball or a device which is worn by the user and responds to the user's movement, such as head, arm, leg, foot, hand, finger, or even eye movement. So-called virtual reality mechanical interfaces can even monitor a human physiological state such as heart rate to provide a signal to interact with an audio-visual display. Non-mechanical interfaces such as voice- or other sound-operated interfaces may also be used.

Accordingly, modern remote controlled electronic devices and user operated transmitters are called upon to perform an increasing number of complex tasks. For manufacturers and others, there is a concomitant increasing need to provide automated testing of such electronic devices to verify the functionality and reliability of the devices, e.g., to "exercise" the devices. "Functionality" refers to the various functions that the IR transmitter can command the device to perform, for example, power on or off, and so forth. A device with good functionality performs the commanded function accurately. "Reliability" refers to how well the device stands up after performing repeated operations. A device with good reliability performs the commanded functions over the expected lifetime of the device.

It would therefore be desirable to have an automated testing apparatus and method which allows for the relatively simple and inexpensive testing of the functionality and reliability of an IR-controlled electronic device. The system should provide testing at various phases of the design of the electronic device, including firmware development, hardware development, system test, quality assurance, reliability testing and production testing.

The system should emulate the different aspects of human interaction with a mechanical interface, such as a hand held infrared remote transmitter, without requiring a user or mechanical robot to continuously press the keypad buttons of the transmitter or otherwise operate the interface. The system should simulate different key press sequences, key press durations, and intervals between key presses, as well as other types of mechanical interfaces. The system should have a learning mode to record and process user control actions from the mechanical interface, and provide corresponding control signals to the automatic signal generator. The system should have the capability to time-compress and repeat the user control actions.

The system should provide significant savings of time and resources by speeding up the test process and providing a means of stress testing. The system should also assist in production of remote controlled devices by expediting product set-up.

The present invention provides a system having the above and other advantages.

SUMMARY OF THE INVENTION

In accordance with the present invention, an automated IR signal generator apparatus and method are presented.

The system includes a personal computer (PC) or equivalent driver program that writes data out to a serial port to drive a microprocessor-based IR protocol emulator. The driver program reads an input file that describes the remote control key presses or other user input to emulate. The input is written as a macro script language which provides the capability to emulate all of the keys of a key pad or, generally, all of the different control inputs that a user may provide to an interface such as a joystick, track ball, mouse, keyboard or the like. The signal generator can be configured to emulate the remote control devices of different manufacturers.

The automated signal generator emulates many different aspects of a human being pressing keys on a remote control device, but faster and without the tedium of a user pressing the keys multiple times over an extended period of time, e.g., several hours or days. The system therefore allows testing that has previously been impossible or impractical. As an example, the system of the present invention can accelerate and automate the stress testing of an IR-controlled device by continually exercising the device with commands. The durability of a device can be determined by performing stress testing until the device fails.

Random or scripted key press sequences may be provided. With a random sequence, for example, the particular key which is pressed and the duration between key presses can be randomized. A random sequence is advantageous because it relieves the operator of having to provide an extensive series of scripted key press commands. A random sequence can also be used for other types of human interfaces which do not have key boards. For example, random movements of a joy stick can be provided by specifying the movement and the movement time.

A pause capability may be provided to allow the program to wait for user input before continuing. The automated signal generator can be configured to repeatedly cycle through a given key sequence in a "cycling mode", or a "run once and terminate" mode may be used. The cycling mode is useful for repetitive testing, while the run once and terminate mode allows the automated signal generator commands to be embedded into other test programs or batch files.

The system is useful for automated testing for firmware development, as well as for other applications such as system, hardware, and production testing. The testing spans functional testing, reliability testing, product set up, initialization or configuration of virtually any IR-controlled device. The term "test signal" or the like as used herein is meant to encompass signals used for any of the above applications.

The system allows a wider test coverage in a given time because of its speed and automation. Another benefit is that it allows complete repeatability of tests, documented testing since a key press script documents the test, and isolation of a problem such as a memory leak or other software defect. For example, a memory leak refers to the gradual reduction with time in available memory in an IR-controlled device, and may be caused when the memory is called upon to repeat the same task over and over. With normal use, the problem may be manifested in a year or so. However, with the accelerated testing made possible by the present invention, the problem can be detected in a matter of hours or days.

The system can be integrated with larger test systems for IR-controlled devices to provide expanded test capabilities. The automated signal generator replaces the human interface which was previously required to perform such tasks. The automated signal generator can further be used to provide an IR input to control a television decoder, while a computer system monitors the decoder's output and compares it to the expected output.

The system can be used by television decoder designers as well as independent software vendors who develop applications for the decoders, and can easily be extended for use with other remote controlled devices.

The system can be configured in a continuously driven ("slaved") mode, or a single download ("standalone") mode. In the slaved mode, a computer remains attached to the signal generator to continually send it commands, and the signal generator executes the commands immediately upon receipt. The computer provides a means for entering external user input during a test script, or to receive output regarding the progress of the test. The computer also allows the signal generator to be integrated with other automated test tools. If frequent changes are required to the input script, it is convenient but not required to have a dedicated computer for each signal generator.

In standalone mode, commands are downloaded from the PC into the signal generator hardware, and then the hardware can be detached and run independently of the PC. On-board battery backup allows the signal generator to retain the downloaded commands. The standalone mode also encompasses a unitary or self-contained mode, where the functions of the PC and the signal generator are performed by one device.

In a first embodiment, an automated signal generator apparatus for providing an IR signal to a device under test comprises a microprocessor, an IR transmitter, and means for receiving test instructions and providing the test instructions to the microprocessor. The microprocessor executes the test instructions to provide a corresponding control signal to the IR transmitter, and the IR transmitter uses the control signal to radiate a corresponding IR signal to control the device under test.

The test instructions are provided by a computer which is external to the signal generator, and the means for receiving test instructions comprises a data port such as an RS-232 serial PC port. An RS-232 port is a bi-directional communication port which allows the microprocessor to communicate with the external computer to receive the test instructions. A uni-directional port can also be used. The port enables the external computer to control the microprocessor in a slaved mode, where the test instructions are executed by the microprocessor substantially as soon as they are received.

Furthermore, the external computer may provide control signals which simulate a cable television headend to a device under test which is a television decoder. The test instructions may be coordinated with the control signals. For example, the control signal from the external computer may initialize or otherwise set up the decoder so that it is prepared to receive the IR signals from the signal generator.

The automated signal generator may have a memory such as a ROM for allowing the microprocessor to translate the test instructions to the corresponding control signal. The ROM may include a lookup table which outputs a modulated signal that corresponds to a particular key press on a key pad as defined by the test instructions, for instance.

The test instructions simulate a sequence of user inputs to a human interface, such as a key press sequence or other control sequence which a user provides.

In a second embodiment, the automated signal generator includes a microprocessor, an IR transmitter, a first memory for storing data, and means for providing the data to the microprocessor. When the data comprises test instructions, the signal generator includes a data port for receiving the test instructions from a computer which is external to the signal generator.

The signal generator may operate in a standalone mode such that the test instructions are downloaded from the external computer, stored in the first memory, and subsequently executed by the microprocessor independent of the external computer.

Alternatively, the data may include a control signal from an interface processor of a human interface. The control signal is received at a data port and provided to the IR transmitter immediately upon receipt, or after being stored in a second memory. Timing means such as a clock allows the microprocessor to repeatedly provide the control signal to the IR transmitter, and/or to provide the control signal to the IR transmitter at a rate which is greater than a rate at which the control signal was received at the data port. Thus, the control signal is repeated and/or sped up to lengthen or accelerate testing of the device under test.

In a third embodiment, an interface processor apparatus is presented for providing a control signal from a human interface to an automated signal generator. The processor includes a microprocessor, a storage device for receiving and storing the control signal from the human interface, means for providing the control signal to the microprocessor, and timing means for allowing the microprocessor to repeatedly provide the same control signal to the automated signal generator, and/or allowing the microprocessor to provide the control signal to the automated signal generator at a rate which is greater than a rate at which the control signal was received at the interface processor.

The control signal simulates a sequence of user inputs to the human interface, and is provided to the automated signal generator to test the functionality or reliability of the device under test.

Related methods are also presented.

DETAILED DESCRIPTION OF THE INVENTION

In accordance with the present invention, an automated IR signal generator apparatus and method are presented.

Figure 1:
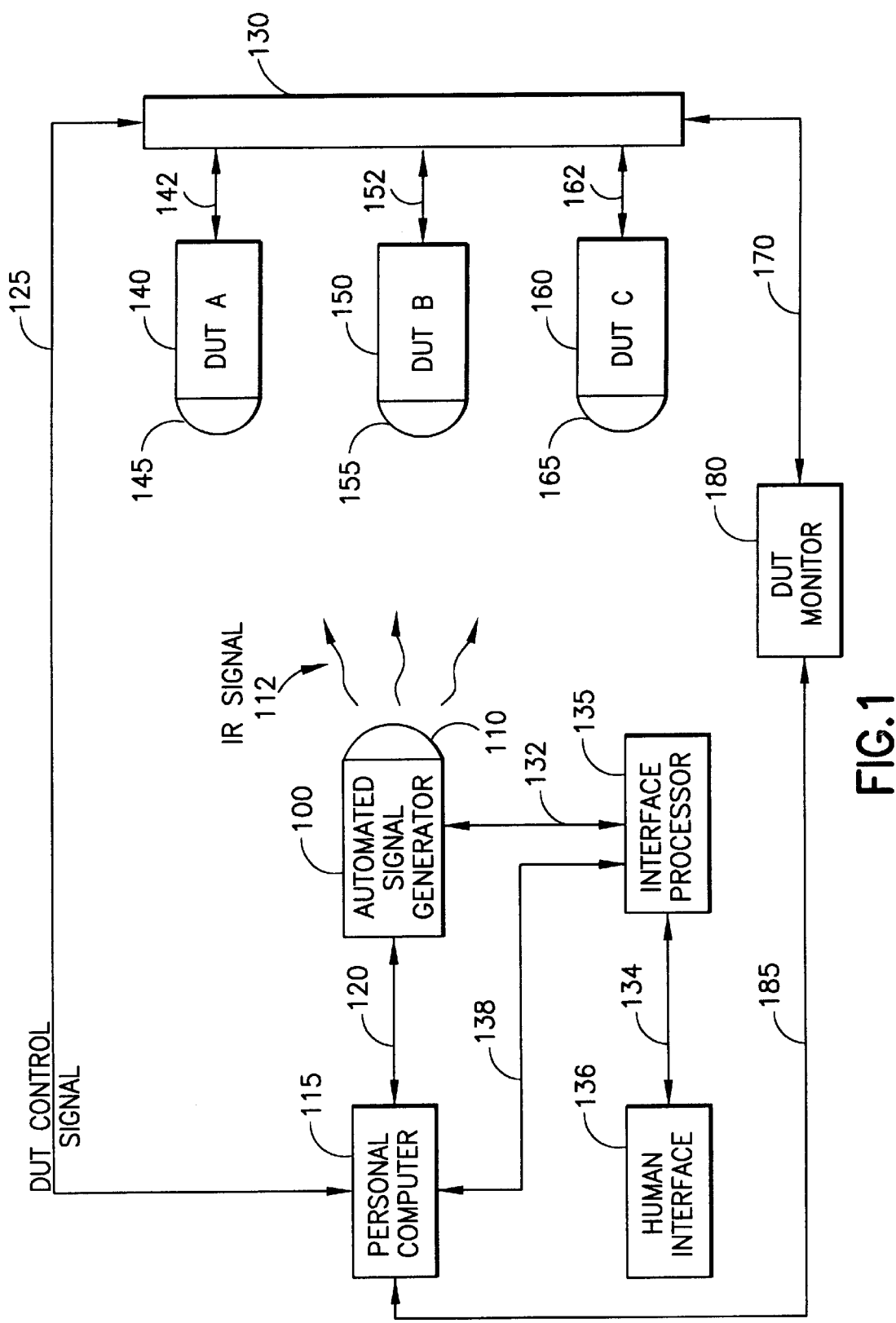
FIG. 1 is an illustration of an arrangement for an automated IR test signal generator and devices under test in accordance with the present invention.

FIG. 1 is an illustration of an arrangement for an automated IR test signal generator and devices under test in accordance with the present invention. An automated IR signal generator 100 has a driver and transmitter 110 that transmits IR control signals 112 to one or more Devices Under Test (DUT), such as DUT A 140, DUT B 150 and DUT C shown at 160. Three DUTs are shown as an example only. The IR control signals are received by respective IR receivers 145, 155 and 165 of the DUTs. IR transmitter and receiver technology is well known and therefore will not be discussed in detail herein. The DUT is virtually any electronic device which is operated by IR control signals, and may include a television decoder, or other video, audio or computer equipment or the like.

The signal generator 100 provides the IR control signals 112 based on test instructions which are received from a computer such as a personal computer (PC) 115 via a line 120. The term "line" as used herein is meant to encompass a bus, port, multiple lines, or virtually any type of communication path. The signal generator 100 translates or converts the test instructions to an electronic control signal which is received by the IR transmitter 110. The IR transmitter 110 may emit a wide-angle beam with sufficient power to be detected by each of the DUTs.

The signal generator 100 may be operated in a "slaved" mode or a "standalone" mode. In the slaved mode, the signal generator receives test instructions throughout the course of the test, which may be several hours or even days. In the standalone mode, the test instructions are downloaded to a memory in the signal generator so that the signal generator 100 is independent of the computer 115 during the course of the test. The test instructions may be written in a macro script language. Conveniently, in standalone mode, the signal generator 100 may be detached from the computer 115 and transported elsewhere.

The test instructions may correspond to a scripted series of commands, such as "go to channel 20, channel up ten times, and channel down ten times." Alternatively, the test instructions may provide a random command sequence using a random number generator, for example, to select among the available commands. With a random sequence, for example, the particular key which is pressed and the duration between key presses can be randomized. A random sequence avoids the need for an extensive series of scripted key press commands, and can also be used for other types of human interfaces which do not have key boards.

In another embodiment, the automated signal generator 100 and computer 115 may be unitary. In this case, a user may input test instructions or program the signal generator 100 directly using a keyboard, for instance. However, due to the widespread use of personal computers, it may be more economical to provide the signal generator 100 as a separate unit. Moreover, a single personal computer can be used to download test instructions to many autonomous automated signal generators without requiring multiple dedicated personal computers.

The DUTs 140, 150 and 160 optionally communicate with a bus 130 which is coupled to the personal computer 115 via a line 125, and to a DUT monitor 180 via a line 170. For this purpose, a line 142 is provided for DUT A 140, a line 152 is provided for DUT B 150, and a line 162 is provided for DUT C 160.

The computer 115 may transmit DUT control signals to the DUTs via the line 125. For example, when the DUTs are television decoders such as used in a cable television (CATV) system, the DUT control signals can simulate signals provided from a cable television headend controller. For example, the computer 115 can provide initialization data, a channel map, or other data. The data may force a television decoder to tune to a particular channel in order to test the decoder. This is often necessary during production of the decoder. Moreover, a secret key sequence may be entered using IR signals which otherwise could not be provided by a user's remote control device. The headend control data can be simulated on a PC using a PC card and software.

The DUT monitor 180 can comprise a number of configurations. Generally, the monitor is any detection equipment which processes a feedback signal from the DUTs to measure the DUTs' response to the IR control signals 112. Such a feedback signal may indicate, e.g., whether a particular DUT is responding to the IR control signals, whether the power is on, or the channel that the DUT has tuned.

The DUT monitor 180 may optionally communicate with the computer 115 via a line 185 to provide a closed loop test set-up. Alternatively, the computer 115 may be used as a DUT monitor. Various types of data acquisition hardware and software can be used to acquire a signal from the DUTs.

For example, a television decoder may include circuitry which provides various signals such as flags which indicate the decoder's operating state, including the presence of any errors or failures. Such flags may be communicated to the DUT monitor 180 and stored there during the course of a test by tapping into the appropriate circuitry. Some modern decoders include external ports which can output such data.

The channel that a decoder is tuned to can also be determined by tapping into the appropriate circuitry in the decoder, or by monitoring the signal provided to a channel display of the decoder, such as a digital seven-segment light-emitting diode (LED) display. The DUT monitor 180 can monitor a video signal which is output from the DUTs 140, 150 and 160 to process an auxiliary data field that is provided for each channel to monitor the current channel.

Thus, the DUT monitor 180 receives feedback signals of some sort which indicates the state of the DUTs. The particular feedback signal provided will depend on the desired test objective. For example, if the test objective is to determine the average DUT lifetime before failure, where the DUT receives a predetermined sequence of IR control signals, then the DUT monitor 180 need only detect the time of failure for each DUT. If the test objective is to verify that the DUT switches properly through a sequence of channels, the DUT monitor 180 must detect and record the channel sequence and compare it to the test instructions.

The DUT monitor need not be coupled to the bus 130 as shown. Instead, the DUT monitor may comprise other detection and recording means, such as a video camera which is trained on the DUTs. For example, by recording the channel display of a DUT on video tape, it can be ascertained when the DUT is no longer responding to an IR control signal for channel up or channel down, or power on and off. When the DUTs are television decoders that are coupled to provide a video image for display on a video screen, or the DUTs themselves are televisions, the DUT monitor 180 may comprise a video camera which is trained on the screen. The video camera may detect a blank or black screen which indicates a DUT failure.

Optionally, in a human "learning" mode, discussed in greater detail in connection with FIG. 5, the automated signal generator 100 may receive control signals via a line 132 from an interface processor 135, which in turn communicates with a "human interface" 136 via a line 134. The interface 136 may be a mechanical interface such as a keypad, joystick, lever, mouse, wheel, pressure activated switch, track ball or a device which is worn by a human, for example.

In a scripted mode, the human may operate the interface according to a predetermined script. For example, several individuals may be asked to press the channel up or channel down button on a key pad several times consecutively. In this manner, human performance data can be recorded and processed at the interface processor 135. Different performance data will be obtained from the different users since characteristics such as the average time that a key is pressed will vary. It may be desirable for testing to have the signal generator simulate the actual range of key press durations which are detected from the different users.

A corresponding control signal is determined from the human interface 136 and provided to the signal generator 100. It will be appreciated that it is not required to provide the control signals from the interface processor 135 to the signal generator 100 on a real-time basis as the human interface 136 is being used. In fact, for reliability testing, for instance, the IR control signals are provided at a rapid fire rate and lengthy duration which cannot be simulated by a human. An example of such a sequence is "toggle between channel up and channel down twice a second for several hours." Moreover, statistical techniques require that the same IR control signals be provided to each DUT to eliminate variables due to human performance. Thus, the control signals from the human interface 136 may be recorded, then duplicated and/or sped up at the interface processor 135 or at the signal generator 100.

For example, when a user presses a key on a key pad, a control signal is generated in the interface 136 which normally commands an IR transmitter in the interface to produce an IR signal. However, here, the control signal to the IR transmitter in the interface 136 is intercepted and recorded and processed before being provided to the signal generator 100 and ultimately, to the IR transmitter 110 in the signal generator. The control signal on line 134 can be a modulated digital or analog signal that can be recorded on conventional storage media such as magnetic tape or computer disk, or on a hard drive in the PC 115, for example, via a line 138.

The control signal can be processed at the interface processor 135 by being duplicated repeatedly. For example, a ten minute sequence of user inputs to the interface 136 can be duplicated over and over to produce a several hour sequence of control signals. The control signal can also be processed at the interface processor 135 by being sped up, e.g., time-compressed. That is, a ten minute sequence can be duplicated at a higher clock rate, e.g., at a 5:1 compression ratio, to become a two minute sequence. Then, the two minute sequence can be duplicated over and over to produce a several hour sequence of rapid control signals.

It is possible for the control signals from the human interface 136 to be provided to the signal generator 100 by the interface processor 135 on a real-time basis, if desired. For example, a ten minute key press sequence can be recorded directly by a memory in the signal generator, such as random access memory (RAM) or electrically erasable programmable read-only memory (EEPROM). The signal generator 100 may be programmed to provide the control signal to the IR transmitter 110 repeatedly at the same rate the control signals were received (i.e., at the rate the user input the commands to the interface 136), or at an increased rate, if desired.

In a non-scripted mode, the human may operate the interface 136 normally. For example, a joystick for a video game may be operated by having several users play the game. The interface processor 135 records the control signals from the human interface 136 and provides corresponding processed control signals to the signal generator 100. It should be appreciated that interface processor 135 can reside in, and be part of, PC 115 instead of being a separate component as illustrated in FIG. 1.

Figure 2:
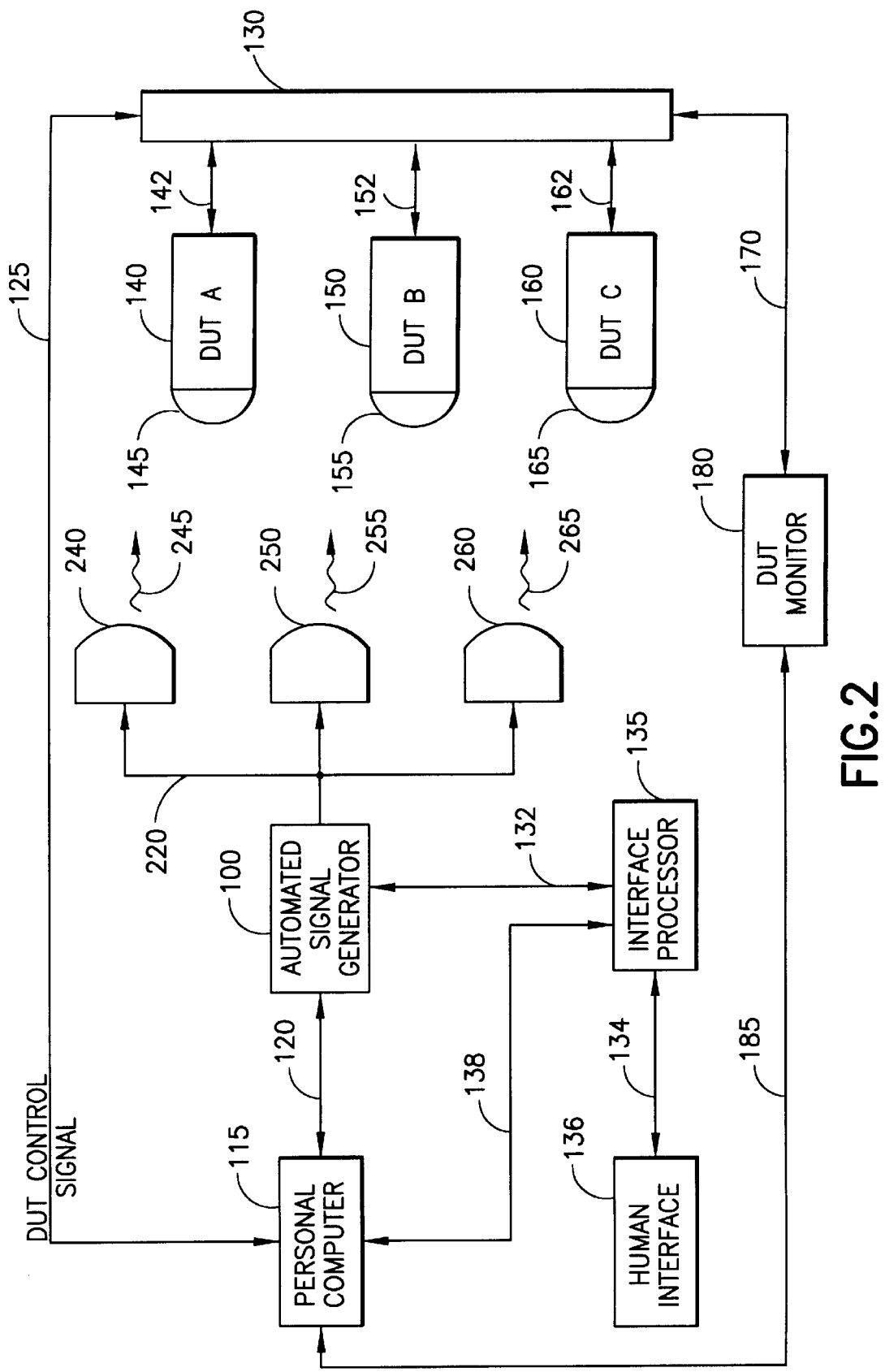
FIG. 2 is an illustration of an alternative arrangement for an automated IR test signal generator and devices under test in accordance with the present invention.

FIG. 2 is an illustration of an alternative arrangement for an automated IR test signal generator and devices under test in accordance with the present invention. Like-numbered elements correspond to the elements in FIG. 1. Here, the automated signal generator 100 provides electronic control signals via a line 220 to a plurality of IR transmitters 240, 250 and 260. This configuration is particularly suitable for testing a large number of DUTs. Each IR transmitter transmits the same IR control signals.

For example, IR transmitter 240 transmits IR control signals 245 to the DUT 140, IR transmitter 250 transmits IR control signals 255 to the DUT 150, and IR transmitter 260 transmits IR control signals 265 to the DUT 160. It is possible but not required to have one IR transmitter for each DUT. For large scale testing of several DUTs, it is only required to have a sufficient number of IR transmitters which are located at positions such that each DUT is within transmitting range.

Figure 3:
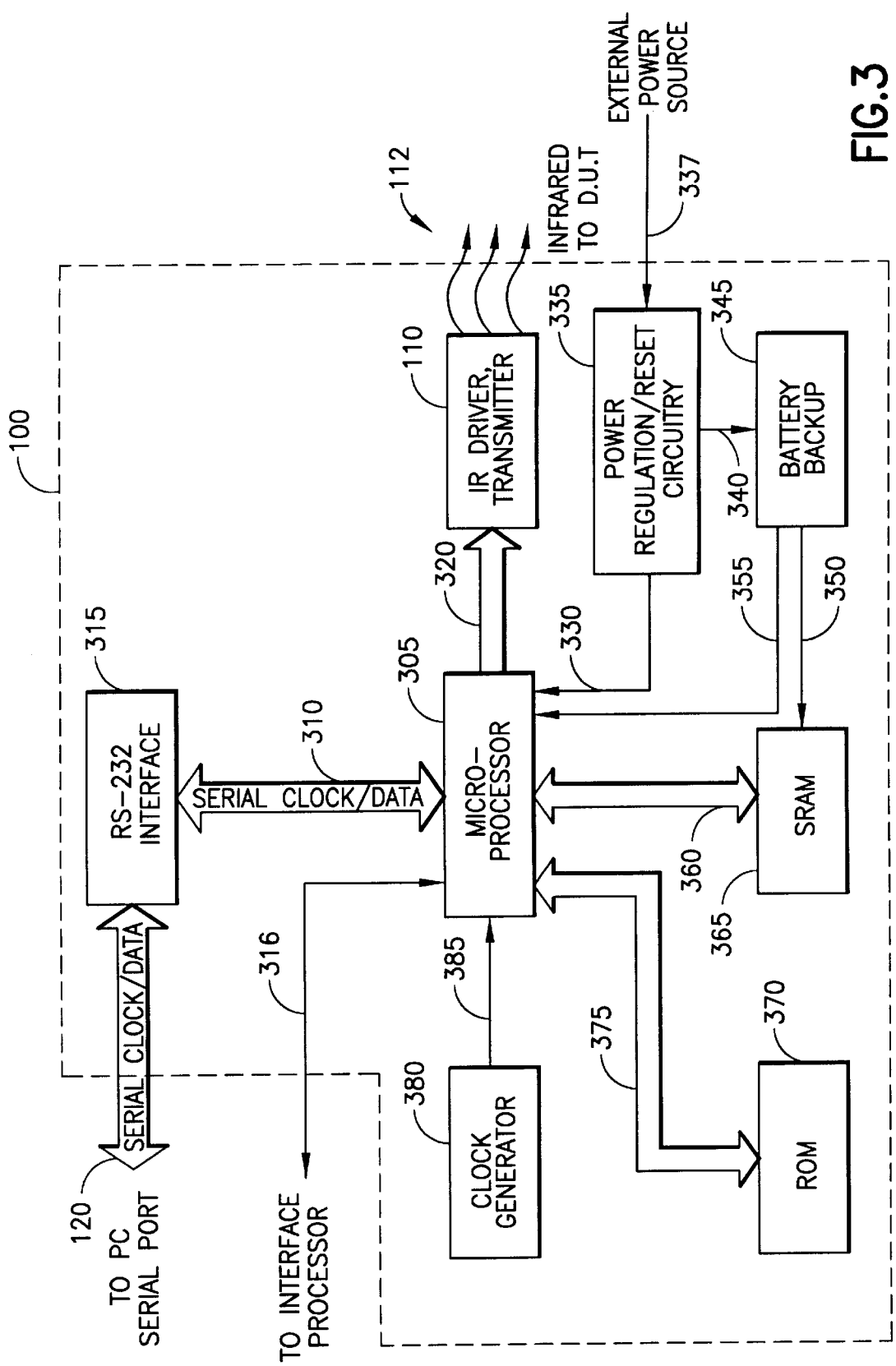
FIG. 3 is an illustration of an automated IR test signal generator in accordance with the present invention.

FIG. 3 is an illustration of an automated IR test signal generator in accordance with the present invention. Like-numbered elements correspond to the elements in FIGS. 1 and 2. The automated test signal generator 100 communicates with a PC serial port via a line 120 to send and receive a serial clock and data. In particular, the personal computer 115 of FIG. 1 may provide a serial data stream comprising test instructions in a macro script language to an RS-232 interface 315 of the signal generator 100 via line 120.

The RS-232 interface 315 communicates in turn with a microprocessor 305 via a line 310 to send and receive the serial clock and data. The RS-232 interface 315 converts serial data to complementary metal oxide semiconductor (CMOS) voltage levels which can be read by the microprocessor 305. The microprocessor may be an eight-bit microprocessor, and is responsive to a clock generator 380 which provides a clock signal via a line 385. Generally, the microprocessor 305 receives and processes test instructions from the external computer, stores the test instructions if required, and translates the test instructions to an electronic control signal which is provided to the IR driver and transmitter 110 via a line 320 to provide the IR control signals 112.

A memory such as a read-only memory (ROM) 370 communicates with the microprocessor 305 via a line 375. The ROM 370 is programmed with data such as a lookup table which translates the test instructions to electronic control signals for the IR driver and transmitter 110. A memory such as a static random access memory (SRAM) 365 communicates with the microprocessor 305 via a line 360. The SRAM 365 can store the test instructions when the signal generator 100 operates in standalone mode, and provides other functions such as serving as a scratchpad memory.

When the signal generator 100 operates in standalone mode, a battery backup 345 provides power to the SRAM 365 via a line 350 to maintain the test instructions or other data therein when the signal generator 100 is powered down, e.g., from an external AC power source. This allows the test instructions to be downloaded to the SRAM 365 from the personal computer at one location, and to have the signal generator 100 powered down and transported to another location for subsequent use, such as a factory assembly line or testing laboratory. The battery backup 345 can also provide a power signal to the microprocessor 305 via a line 355 when the signal generator 100 is powered down from an external AC power source.

Alternatively, or in addition to receiving test instructions from the personal computer, the microprocessor 305 may receive control signals from the interface processor 135 of FIGS. 1 and 2 via a line 316. These control signals can be provided directly to the IR driver and transmitter 110, or stored in the SRAM 365 for later use. Note that the SRAM 365 can store the control signals received via line 316 in addition to, or instead of, test instructions received via line 120. The control signal on line 316 may comprise an unaltered control sequence, such as a ten minute sequence of key presses from the human interface 136, or the control signals may be processed by the interface processor 135 to comprise a repeated sequence, such as several hours of a repeated ten minute sequence. The control signals may also be processed by the interface processor 135 to be sped up from real time, such as when a ten minute sequence is compressed to a two minute sequence.

Due to storage limitations of the SRAM 365, it may be desirable to have the microprocessor 305 provide the same IR control signal to the IR driver and transmitter 110 over and over rather than storing several hours of a repeated sequence. The microprocessor 305 may also have the capability to speed up the control signals from real time in conjunction with the clock generator 380. For this purpose, more than one clock generator may be provided, a divider or multiplier may be used with a single clock generator, or a programmable clock generator may be used.

Power regulation and reset circuitry 335 ensures that the microprocessor 305 has proper power levels to function. The circuitry 335 receives a power signal from an external power source (such as an AC source) via a line 337 and provides a steady power signal to the microprocessor 305 via a line 330, and sends a signal to the battery backup 345 via a line 340 when the signal generator 100 is powered down from the external power source to instruct the battery backup 345 to begin powering the SRAM 365.

Figure 4:
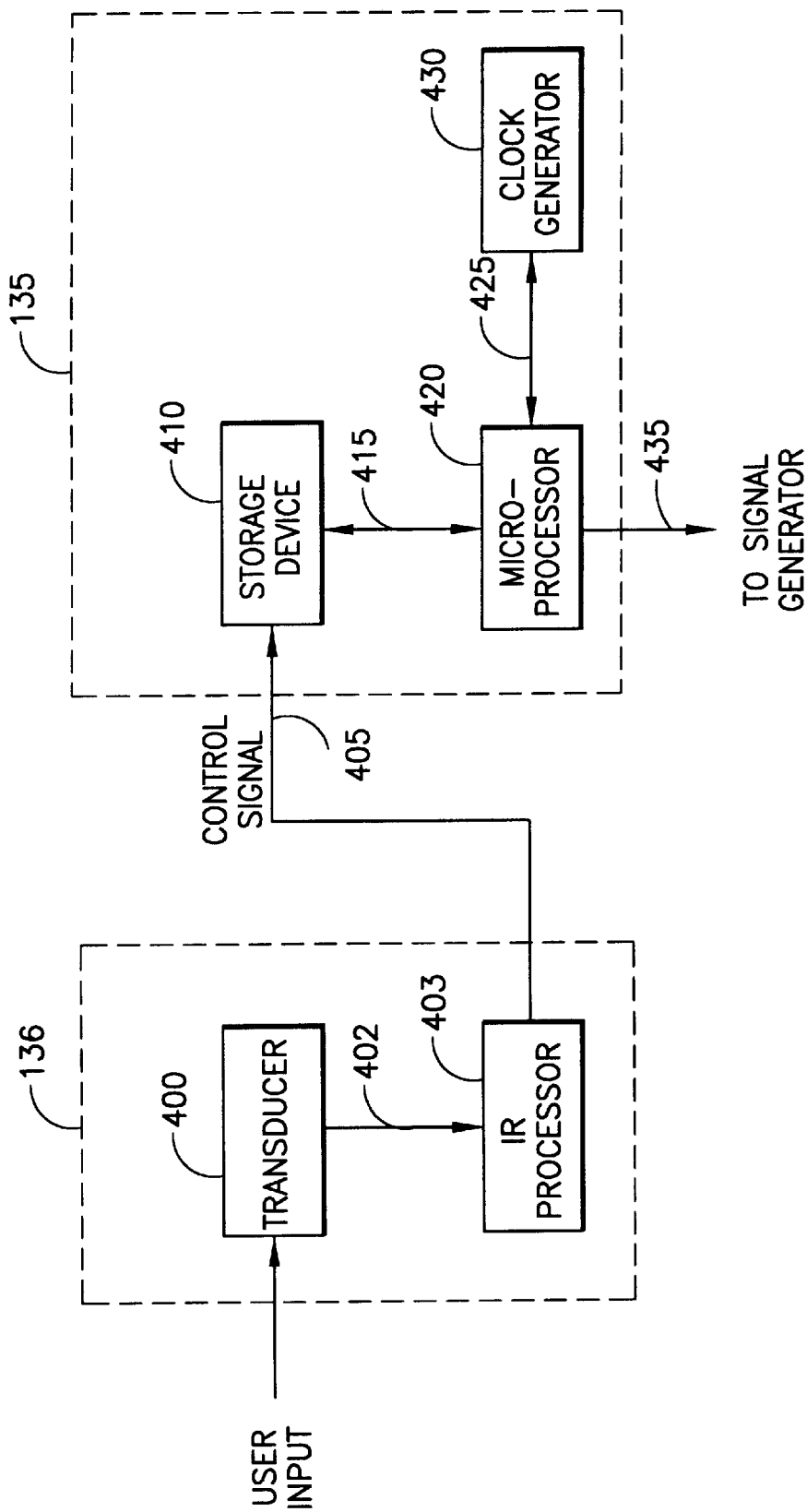
FIG. 4 is an illustration of a human interface and interface processor in accordance with the present invention.

FIG. 4 is an illustration of a human interface and interface processor in accordance with the present invention. Like-numbered elements correspond to the elements in FIGS. 1–3. The system is useful in a human learning mode discussed also in connection with FIG. 5. In particular, the human interface 136 includes a transducer 400 which converts a user input to an electrical signal on line 402. The electrical signal is processed by an IR processor 403, which may include a microprocessor and look-up table which converts the electrical signal to a control signal on line 405.

For interfaces such as a joystick or key pad, one or more transducers 400 in the interface 136 convert movements of the stick or key presses to the electronic signal on line 402. For example, an electrical signal on line 402 which corresponds to a key press for "channel up" may be converted at the IR processor 403 to a digital control signal of "10101". This control signal commands an IR transmitter to flash in the sequence: on, off, on, off, on. Particular IR modulation schemes will not be discussed in detail here as they are well known in the art.

Thus, the IR processor 403 translates the electrical signal on line 402 to a form which is suitable for direct input to the IR driver and transmitter 110 of the signal generator. Alternatively, the required IR processing can be provided at the processor 135 or signal generator 100, in which case the IR processor 403 is not required. For example, the human interface 136 may be a joy stick which is directly plugged into the signal generator 100 so that the signal generator 100 processes the signals from the transducer 400. It may be necessary to tap into circuitry of the interface 136 to obtain the control signal on line 405.

The control signal is provided to a storage device 410 in the interface processor 135. The storage device may be a magnetic tape or disk, or optically write-able disk, for instance, or a memory such as a RAM. A microprocessor 420 communicates with the storage device 410 via a line 415, and with a clock generator 430 via a line 425. The control signal from the interface 136 may be sped up by having the microprocessor 420 output the control signal data from the storage device 410 to the signal generator 100 at a particular clock rate.

The control signal data may be also be repeated by the microprocessor 420 or the signal generator 100 using known techniques which will become apparent to those skilled in the art.

Furthermore, it should be understood that the human interface 136 and interface processor 135 may operate in similar modes as the personal computer 115. For example, the interface processor 135 can continually provide control signals to the signal generator 100 which are immediately executed. Or, the control signals can be stored for later use. Moreover, the interface processor 135 may be unitary with, or independent of, the signal generator 100 or the PC 115. In a further variation, the IR processor human interface 136 and processor 135 may be unitary.

Figure 5:
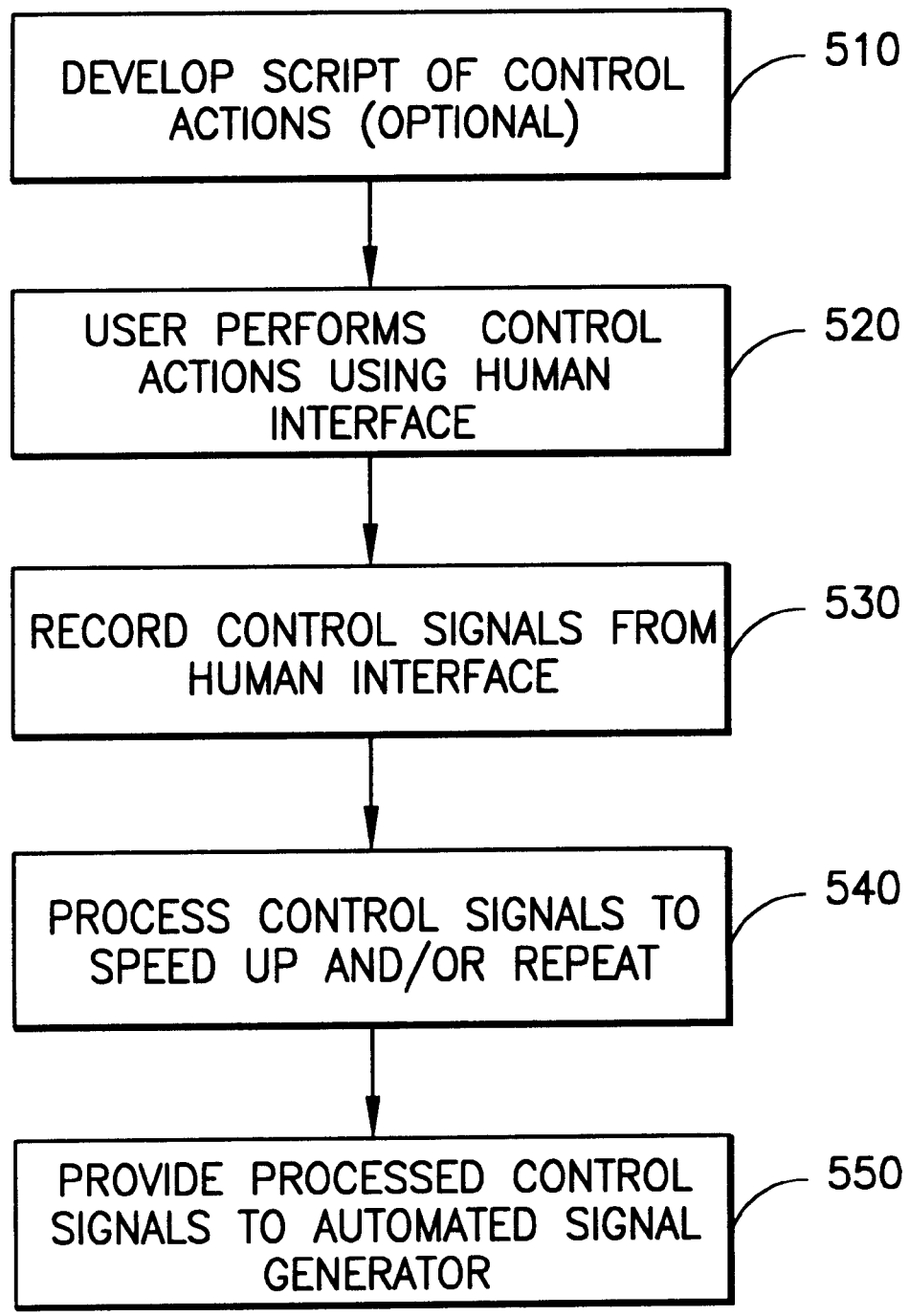
FIG. 5 is an illustration of a method for providing time-compressed or repeated control signals to an automated signal generator in accordance with the present invention.

FIG. 5 illustrates a method for developing test instructions for the automated signal generator in accordance with the present invention. The method is used in conjunction with the human interface 136 and interface processor 135 of FIGS. 1, 2 and 4. The goal of a human "learning" mode is to easily develop test instructions for the automated signal generator which realistically emulate human interactions with an interface. For example, when the interface is a key pad, the human interaction involves key press duration, key press sequence, frequency between key presses and so forth. It is often easier to simply record and process actual user inputs rather than develop a macro language which simulates the key presses or other interface actions.

For other types of interfaces, such as a joystick or mouse for playing a video game on a television screen, the human interaction may include frequent rapid movements of the joystick or mouse. It is desirable to quickly and easily develop test instructions which emulate the user's control actions so that the IR control signals represent realistic control inputs.

As shown at block 510, a script of user control actions is optionally developed. This may include specific commands, such as "consecutively press and release the channel up button on a key pad ten times, then consecutively press and release the channel down button on the key pad ten times, then consecutively toggle the power on and off ten times." The user may simply read the script from a sheet of paper while operating the human interface.

In a non-scripted human learning mode, the user may be instructed, for instance, to play a video game for a specific time period, e.g., ten minutes. Different users will have different control actions during the course of the game. In either case, as shown at block 520, the user performs a sequence of control actions using a human interface such as a key pad or joystick. At block 530, a record is made of the control signals from the human interface. This may include measurements such as key press duration and so forth, or with a joystick, the rotational position and movement speed of the joystick over the course of a video game can be recorded.

At step 540, the control signals are optionally processed to speed up and/or repeat the sequence of user inputs. At step 550, the processed control signals are provided to the automated signal generator. As discussed, the signal generator or PC may perform the processing of step 540 in addition to or instead of the interface processor, for example, to speed up or repeat the control signals.

Accordingly, it can be seen that the present invention provides an automated IR signal generator which is suitable for testing IR-controlled electronic devices such as television decoders. Test instructions which provide a script of IR commands can be downloaded from an external computer in a slaved mode, where the downloaded commands are immediately executed, or in a standalone mode, where the downloaded commands are stored for later use. The test instructions may be in a macro language which can be translated to IR control signals for an IR driver and transmitter.

Optionally, in a human learning mode, control signals from a human interface are recorded and processed at an interface processor which may be external to the signal generator to speed up and/or repeat the control signals, then provided to the signal generator. These processed signals are in a form suitable for use by the IR driver and transmitter. Alternatively, processing of the control signals from the human interface may occur at the signal generator or in the control computer (e.g., PC) to provide time compression or repetition to avoid the need to store large amounts of data.

Although the invention has been described in connection with various specific embodiments, those skilled in the art will appreciate that numerous adaptations and modifications may be made thereto without departing from the spirit and scope of the invention as set forth in the claims.

For example, while the invention was discussed in terms of testing IR signal generators, it will be appreciated that the invention may be adapted for use with radiation outside of the IR band.

What is claimed is:

1. An automated signal generator apparatus for radiating a test signal to a device under test (DUT), comprising:

a microprocessor;

transmitter means;

means for receiving test instructions and providing said test instructions to said microprocessor; wherein:
   said microprocessor is adapted to execute said test instructions to provide a corresponding control signal to said transmitter means; and
   said transmitter means is adapted to use said control signal to radiate said test signal, said test signal corresponding to said control signal and being suitable for controlling said device under test.

2. The apparatus of claim 1, wherein:

said test signal is an infrared signal.

3. The apparatus of claim 1, wherein:

said test instructions are provided by a computer which is external to said signal generator apparatus; and said means for receiving test instructions comprises a data port.

4. The apparatus of claim 3, wherein:

said port enables the external computer to control said microprocessor in a slaved mode, wherein the test instructions are executed by the microprocessor substantially as soon as they are received.

5. The apparatus of claim 3, wherein:

the external computer provides DUT control signals to said device under test; and said test instructions are coordinated with said control signals.

6. The apparatus of claim 1, wherein a plurality of devices under test are controlled by one of:

(a) said test signal radiated by said transmitter means; and (b) a plurality of test signals radiated by a plurality of transmitters of said transmitter means.

7. The apparatus of claim 1, wherein:

said test instructions simulate a sequence of user inputs to a human interface.

8. The apparatus of claim 1, wherein:

said test instructions simulate a sequence of random inputs to a human interface.

9. An automated signal generator apparatus for radiating a test signal to a device under test, comprising:

a microprocessor;

transmitter means;

a first memory for storing data; and means for providing said data to said microprocessor; wherein:

said microprocessor is adapted to execute said data to provide a corresponding control signal to said transmitter means; and said transmitter means is adapted to use said control signal to radiate said test signal, said test signal corresponding to said control signal and being suitable for controlling said device under test.

10. The apparatus of claim 9, wherein:

said test signal is an infrared signal.

11. The apparatus of claim 10, wherein said data comprises test instructions, said apparatus further comprising:

a data port for receiving said test instructions from a computer which is external to said signal generator.

12. The apparatus of claim 10, wherein said apparatus operates in a standalone mode such that:

the test instructions are downloaded from the external computer;

stored in said first memory; and subsequently executed by the microprocessor independent of the external computer.

13. The apparatus of claim 9, wherein said data comprises a control signal from an interface processor of a human interface, further comprising:

a data port for receiving said control signal; and means for providing said control signal to said transmitter means to cause said transmitter means to radiate the corresponding test signal.

14. The apparatus of claim 13, further comprising:

timing means operatively associated with said microprocessor for at least one of (a) allowing said microprocessor to repeatedly provide said control signal to said transmitter means, and (b) allowing said microprocessor to provide said control signal to said transmitter means at a rate which is greater than a rate at which the control signal was received at said data port.

15. The apparatus of claim 9, wherein a plurality of devices under test are controlled by one of:

(a) said test signal radiated by said transmitter means; and (b) a plurality of test signals radiated by a plurality of transmitters of said transmitter means.

16. The apparatus of claim 10, wherein:

said test instructions simulate a sequence of user inputs to a human interface.

17. The apparatus of claim 9, wherein:

said test instructions simulate a sequence of random inputs to a human interface.

18. An interface processor apparatus for providing a control signal from a human interface to an automated signal generator, said automated signal generator being adapted to radiate a corresponding test signal to a device under test, comprising:

a microprocessor;

a storage device for receiving and storing the control signal from the human interface;

timing means operatively associated with said microprocessor for at least one of (a) allowing said microprocessor to repeatedly provide said control signal to said automated signal generator, and (b) allowing said microprocessor to provide said control signal to said automated signal generator at a rate which is greater than a rate at which the control signal was received at said apparatus.

19. The apparatus of claim 18, wherein:

said test signal is an infrared signal.

20. The apparatus of claim 18, wherein:

said control signal simulates a sequence of user inputs to the human interface.

21. The apparatus of claim 18, wherein:

the control signal which is provided to said automated signal generator is adapted to test at least one of a functionality and a reliability of said device under test.

22. A method for testing a remotely-controlled device under test, comprising the steps of:

providing test instructions which correspond to a sequence of user inputs to a human interface;

communicating said test instructions to an automated signal generator;

processing said test instructions at said automated signal generator to translate said test instructions to an electrical control signal; and providing said electrical control signal to a transmitter to radiate a corresponding signal for controlling the device under test.

23. The method of claim 22, wherein:

said corresponding signal which is radiated is an infrared signal.

24. The method of claim 22, comprising the further step of:

monitoring the device under test to measure at least one of a functionality and a reliability of the device under test.

25. The method of claim 22, wherein:

said human interface comprises a key pad; and said test instructions correspond to at least one of a key press duration, an interval between key presses, and a random key press sequence.

26. A method for testing a remotely-controlled device under test, comprising the steps of:

obtaining a control signal which is output from a human interface and which corresponds to a sequence of user inputs to the human interface;

processing said control signal to at least one of (a) repeatedly provide said control signal to an automated signal generator, and (b) provide said control signal to the automated signal generator at a rate which is greater than a rate at which the control signal was output from the human interface; wherein:

the automated signal generator provides said processed control signals to a transmitter to radiate a corresponding signal for controlling the device under test.

27. The method of claim 26, wherein:

said corresponding signal which is radiated is an infrared signal.

28. The method of claim 26, comprising the further step of:

monitoring the device under test to measure at least one of a functionality and a reliability of the device under test.

29. The method of claim 26, wherein:

said human interface comprises a key pad; and said test instructions correspond to at least one of a key press duration, an interval between key presses, and a random key press sequence.

30. A method for testing a remotely-controlled device under test, comprising the steps of:

obtaining a control signal which is output from a human interface and which corresponds to a sequence of user inputs to the human interface;

communicating said control signal to an automated signal generator;

processing said control signal at said automated signal generator to at least one of (a) repeatedly provide said control signal to an IR transmitter means, and (b) provide said control signal to said IR transmitter means at a rate which is greater than a rate at which the control signal was received by said automated signal generator; wherein:

the automated signal generator provides said processed control signals to the transmitter to radiate a corresponding signal for controlling the device under test.

31. The method of claim 30, wherein:

said corresponding signal which is radiated is an infrared signal.

32. The method of claim 30, comprising the further step of:

monitoring the device under test to measure at least one of a functionality and a reliability of the device under test.

33. The method of claim 30, wherein:

said human interface comprises a key pad; and said control signal corresponds to at least one of a key press duration, an interval between key presses, and a random key press sequence.

* * * * *